US012062061B2

(12) United States Patent
Phillips et al.

(10) Patent No.: US 12,062,061 B2
(45) Date of Patent: *Aug. 13, 2024

(54) ALLOCATION OF SERVICE PROVIDER RESOURCES BASED ON A CAPACITY TO PROVIDE THE SERVICE

(71) Applicant: Capital One Services, LLC, McLean, VA (US)

(72) Inventors: Jeremy Phillips, Brooklyn, NY (US); Zhe Liu, McLean, VA (US); Jeremy Rephlo, Arlington, VA (US); Daniel Filler, Oak Hill, VA (US)

(73) Assignee: Capital One Services, LLC, McLean, VA (US)

( * ) Notice: Subject to any disclaimer, the term of this patent is extended or adjusted under 35 U.S.C. 154(b) by 71 days.

This patent is subject to a terminal disclaimer.

(21) Appl. No.: 17/302,603

(22) Filed: May 7, 2021

(65) Prior Publication Data
US 2021/0264454 A1    Aug. 26, 2021

Related U.S. Application Data

(63) Continuation of application No. 16/737,963, filed on Jan. 9, 2020, now Pat. No. 11,004,098, which is a
(Continued)

(51) Int. Cl.
*G06Q 30/0204* (2023.01)
*G05D 1/00* (2024.01)
(Continued)

(52) U.S. Cl.
CPC ..... *G06Q 30/0205* (2013.01); *G06Q 30/0201* (2013.01); *B64U 2101/00* (2023.01);
(Continued)

(58) Field of Classification Search
CPC .............. G06Q 10/06; G06Q 30/0205; G06Q 30/0201; G06Q 10/0631; G06Q 10/06315;
(Continued)

(56) References Cited

U.S. PATENT DOCUMENTS 5,966,126 A * 10/1999 Szabo .................. G06F 16/338
707/E17.082
6,736,317 B1 * 5/2004 McDonald ............. G07B 15/02
235/382

(Continued)

OTHER PUBLICATIONS

Predictive Positioning and Quality Of Service Ridesharing for Campus Mobility On Demand Systems [arXiv] Miller, Justin; How, Jonathan P.. arXiv: 8 . arXiv. (Sep. 26, 2016).*

(Continued)

*Primary Examiner* — Timothy Padot
(74) *Attorney, Agent, or Firm* — Harrity & Harrity, LLP

(57) ABSTRACT

An example includes one or more devices may include one or more memories and one or more processors, communicatively coupled with at least one of the one or more memories, to identify a service that is provided within a region; identify a model that is associated with the service, the model having been trained based on consumer profile data, service provider data, and historical information; determine a current demand associated with the service in the region; predict, using the model and based on the current demand associated with the service, a future demand for the service during a time period; determine a current capacity to provide the service based on real-time service provider information associated with service providers that are providing the service in the region; and perform an action associated with the service based on the future demand for the service and the current capacity to provide the service.

20 Claims, 6 Drawing Sheets

Related U.S. Application Data continuation of application No. 16/193,500, filed on Nov. 16, 2018, now Pat. No. 10,558,989, which is a continuation of application No. 15/847,146, filed on Dec. 19, 2017, now Pat. No. 10,157,396.

(51) Int. Cl.
*G06Q 10/0631* (2023.01)
*G06Q 30/0201* (2023.01)
*B64U 101/00* (2023.01)

(52) U.S. Cl.
CPC ....... *G05D 1/0291* (2013.01); *G06Q 10/0631* (2013.01); *G06Q 10/06315* (2013.01)

(58) Field of Classification Search
CPC .............. B64C 2201/12; G05D 1/0291; G05D 2201/0213; B64U 2101/00
USPC ........................................................ 705/7.31
See application file for complete search history.

(56) References Cited

U.S. PATENT DOCUMENTS

| | | | | |
|---|---|---|---|---|
| 6,831,663 | B2* | 12/2004 | Chickering | G06Q 10/02 |
| | | | | 707/999.102 |
| 6,978,249 | B1 | 12/2005 | Beyer et al. | |
| 7,096,193 | B1* | 8/2006 | Beaudoin | G06Q 10/06311 |
| | | | | 705/26.1 |
| 8,095,412 | B1* | 1/2012 | Zias | G06Q 30/0205 |
| | | | | 705/7.29 |
| 9,718,564 | B1* | 8/2017 | Beckman | B64F 1/22 |
| 10,157,396 | B1 | 12/2018 | Phillips | |
| 10,459,444 | B1* | 10/2019 | Kentley-Klay | G05D 1/0293 |
| 10,558,989 | B2 | 2/2020 | Phillips | |
| 11,004,098 | B2 | 5/2021 | Phillips et al. | |
| 2002/0019760 | A1* | 2/2002 | Murakami | G06Q 10/08 |
| | | | | 705/7.25 |
| 2004/0015405 | A1 | 1/2004 | Cloutier et al. | |
| 2006/0085408 | A1* | 4/2006 | Morsa | G06Q 30/0256 |
| 2006/0277130 | A1 | 12/2006 | Harmon et al. | |
| 2008/0059270 | A1* | 3/2008 | Baumer | G06Q 10/1097 |
| | | | | 705/7.34 |
| 2010/0106534 | A1* | 4/2010 | Robinson | G06Q 10/02 |
| | | | | 705/5 |
| 2011/0137730 | A1* | 6/2011 | McCarney | H04M 3/42289 |
| | | | | 705/14.58 |
| 2012/0191531 | A1* | 7/2012 | You | G06F 16/958 |
| | | | | 705/14.42 |
| 2013/0246207 | A1* | 9/2013 | Novak | G06Q 30/0641 |
| | | | | 705/26.2 |
| 2014/0365258 | A1* | 12/2014 | Vestal | G16H 40/20 |
| | | | | 901/1 |
| 2015/0058049 | A1* | 2/2015 | Shaw | G06Q 10/02 |
| | | | | 705/5 |
| 2015/0088790 | A1* | 3/2015 | Chidlovskii | G06Q 30/0202 |
| | | | | 706/12 |
| 2015/0134413 | A1 | 5/2015 | Deshpande et al. | |
| 2015/0286507 | A1* | 10/2015 | Elmroth | G06F 9/5061 |
| | | | | 718/104 |
| 2015/0319038 | A1* | 11/2015 | Spencer | G06Q 10/06 |
| | | | | 370/254 |
| 2016/0117642 | A1 | 4/2016 | Sandhu et al. | |
| 2016/0188571 | A1* | 6/2016 | Daniel | G06F 40/30 |
| | | | | 704/9 |
| 2017/0193625 | A1* | 7/2017 | Fan | G06Q 50/40 |
| 2017/0293950 | A1 | 10/2017 | Rathod et al. | |
| 2018/0137594 | A1* | 5/2018 | Marco | G06Q 30/0283 |

OTHER PUBLICATIONS

DHL Trend Research, "DHL Report: Unmanned Aerial Vehicle in Logistics", 2014, 24 pages.

Elliot D., "DHL Testing Delivery Drones," CBS News, Dec. 9, 2013, 4 pages.

Johnson E., "30 Minutes or Less: Drone Delivery Systems," University of Pittsburg, Swanson School of Engineering, 2014, 7 pages.

* cited by examiner

ALLOCATION OF SERVICE PROVIDER RESOURCES BASED ON A CAPACITY TO PROVIDE THE SERVICE

RELATED APPLICATION

This application is a continuation of U.S. patent application Ser. No. 16/737,963, filed Jan. 9, 2020 (now U.S. Pat. No. 11,004,098), which is a continuation of Ser. No. 16/193,500, filed Nov. 16, 2018 (now U.S. Pat. No. 10,558,989), which is a continuation of U.S. patent application Ser. No. 15/847,146, filed Dec. 19, 2017 (now U.S. Pat. No. 10,157,396), the contents of which are incorporated herein by reference in their entireties.

BACKGROUND

In many instances, organizations employ staff members (e.g., employees) to provide a service. Additionally, or alternatively, organizations may use independent contractors, and/or the like to provide the service. In some instances, organizations may utilize machines, such as vehicles, unmanned aerial vehicles (UAVs) (e.g., drones), kiosks, self-serve terminals, and/or the like to provide a service.

SUMMARY

According to some implementations, one or more devices may include one or more memories and one or more processors, communicatively connected to at least one of the one or more memories, to identify a service that is provided within a region; identify a model that is associated with the service, the model having been trained based on consumer profile data relating to consumers that have received the service in the region, service provider data associated with service providers that have provided the service in the region, and historical information associated with providing the service in the region; determine a current demand associated with the service in the region; predict, using the model and based on the current demand associated with the service, a future demand for the service during a time period; determine a current capacity to provide the service based on real-time service provider information associated with service providers that are providing the service in the region; and perform an action associated with the service based on the future demand for the service and the current capacity to provide the service.

According to some implementations, a non-transitory computer-readable medium storing instructions that, when executed by one or more processors, cause the one or more processors to: identify a service that is provided within a region; train a model that is associated with the service based on: consumer trends in consumer profile data relating to consumers that have received the service in the region, service provider trends in service provider data associated with service providers that have provided the service in the region, and historical trends in historical information associated with providing the service in the region; determine a current demand for the service in the region; predict, using the model and based on the current demand for the service, a future demand for the service during a time period; determine a current capacity to provide the service during the time period based on real-time service provider information associated with service providers that are providing the service in the region; and perform an action associated with the service based on the future demand for the service and the current capacity to provide the service during the time period.

According to some implementations, a method may include identifying, by one or more devices, a service that is provided within a region; obtaining, by one or more devices, a model that is associated with the service, the model having been trained based on consumer profile data relating to consumers that have received the service in the region, service provider data associated with service providers that have provided the service in the region, and historical information associated with providing the service in the region; determining, by the one or more devices, a current demand associated with the service in the region; predicting, by the one or more devices, using the model, and based on the current demand associated with the service, a future demand for the service during a time period; determining, by the one or more devices, a current capacity to provide the service based on real-time service provider information for devices associated with particular service providers that are providing the service in the region; comparing, via the one or more devices, the current capacity to provide the service and the future demand for the service to determine whether the current capacity is capable of meeting the future demand for the service; and performing, via the one or more devices, an action associated with the service based whether the current capacity is capable of meeting the future demand for the service.

DETAILED DESCRIPTION

Figure 1A:
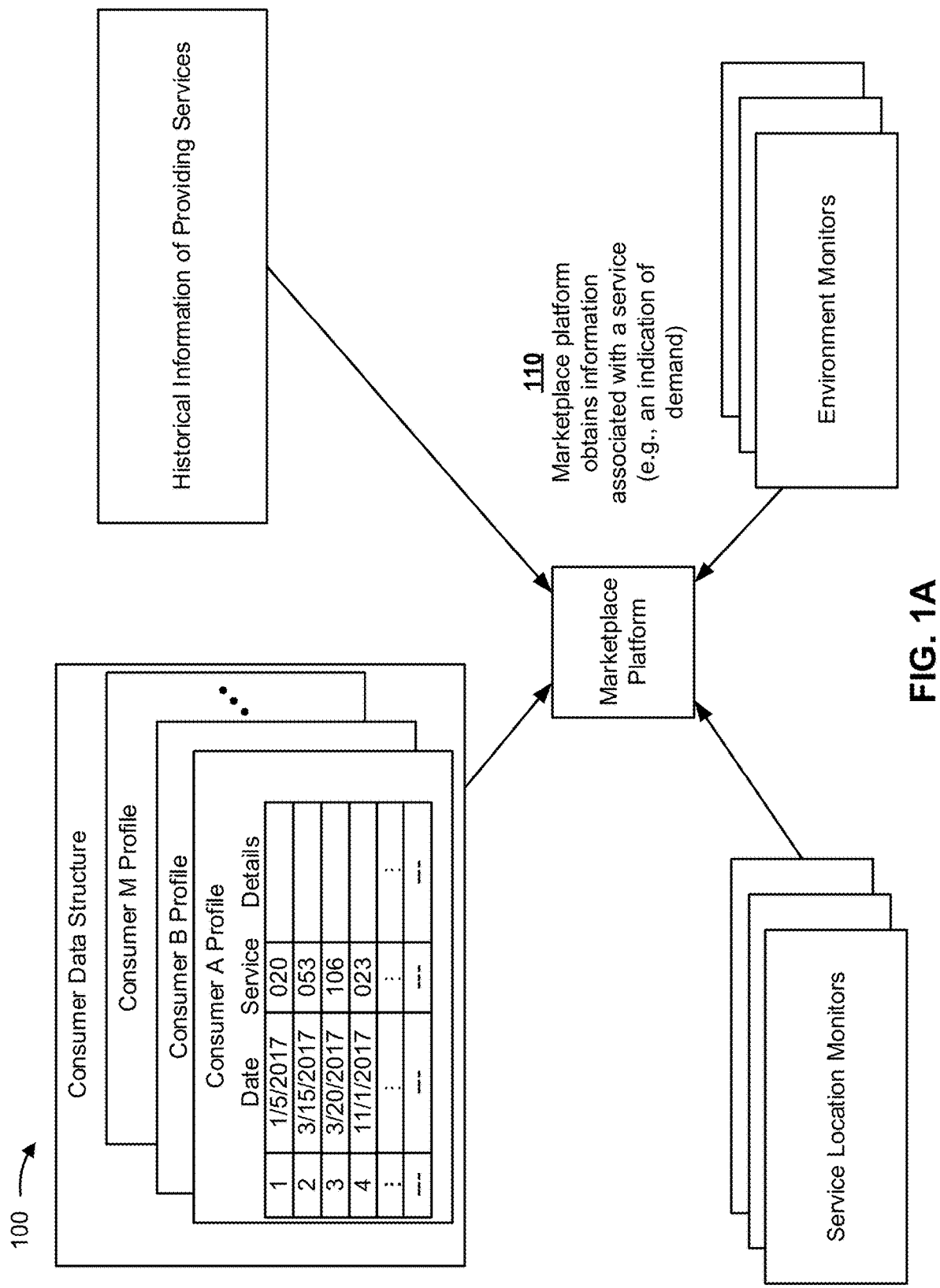
FIGS. 1A and 1B are diagrams of an overview of an example implementation described herein.

The following detailed description of example implementations refers to the accompanying drawings. The same reference numbers in different drawings may identify the same or similar elements.

In many instances, a service provider organization (e.g., a financial institution (e.g., a bank, a credit union, and/or the like), a healthcare organization (e.g., a hospital, a clinic, an urgent care center, and/or the like), a law firm, an accounting firm, and/or the like) staffs service providers (e.g., individuals, such as employees, independent contractors, and/or the like) at one or more service locations (e.g., a bank branch, a hospital, firm offices, and/or the like). Accordingly, an amount of service providers employed by a particular service provider organization and/or an amount of service provider equipment used to provide the service may be limited to an amount of space available at the one or more service locations of the service provider organization. Furthermore, location(s) of the one or more service locations may limit a service provider organization's ability to provide a service to within a certain range of the service location(s) of the service provider organization.

As such, in many instances, during particular time periods, the service provider organizations may be understaffed and/or underequipped to provide a particular service. For example, during tax season, banks or accounting firms may need to temporarily hire additional staff and, during holidays, retailers, transportation companies, and/or other types of organizations may need to do the same. As another example, during a natural disaster, in general for both service provider and consumer, resources can be drastically limited as an entire region attempts to recover from the natural disaster. Some implementations described herein provide a marketplace platform to facilitate adjusting an amount of service provider resources available to provide a service. The available service provider resources may include service providers (e.g., individuals or personnel that provide the service or facilitate providing the service, such as employees of the service provider organization, independent contractors, and/or the like) and/or service provider equipment (e.g., one or more machines that provide the service or facilitate providing the service) that can be made available to provide a service or withdraw from providing the service, during a particular time period, according to a predicted demand for the service.

According to some implementations described herein, a model may be trained based on a set of data (e.g., consumer related data, service provider related data, and/or historical information) and used to predict a future demand for a service during a particular time period. In some implementations, a current demand for the service may be monitored and/or analyzed to predict the future demand for the service. Further, based on the future demand and a capacity to provide a service, a marketplace platform may facilitate increasing or decreasing service provider resources in accordance with the future demand. For example, the marketplace platform may have access to a service provider organization's resources, availability of additional service providers (such as employees (e.g., remote employees, off duty employees, and/or the like), independent contractors that are capable of providing the service or potentially capable of providing the service, and/or the like), additional available service provider equipment (e.g., autonomous (or semi-autonomous) vehicles (e.g., autonomous cars, an autonomous trucks, an autonomous semi-tractors or autonomous semi-tractor trailer combinations, and/or the like), an unmanned aerial vehicle (UAV) (e.g., a drone), portable kiosks (e.g., kiosks that may be included within or attached to one or more autonomous vehicles), transaction terminals, and/or the like) for use in meeting the future demand.

Accordingly, the marketplace platform may enable the service provider organization to quickly and efficiently adjust service provider resources to meet a demand for a service. As such, service provider organizations may avoid turning away consumers (e.g., and losing profits, losing good will, losing an ability to meet a consumer's needs (which can be critical)). Further, some implementations herein may avoid wasting computing resources due to having an unnecessary amount of equipment available. In some implementations, networking resources may be conserved due to unnecessary communications over a network, due to avoiding receiving requests for service from consumers, due to avoiding receiving requests from service providers to be available to provide a service, and/or the like. Additionally, or alternatively, power resources may be conserved due to avoiding unnecessary equipment from being powered on and/or in use.

Figure 1B:
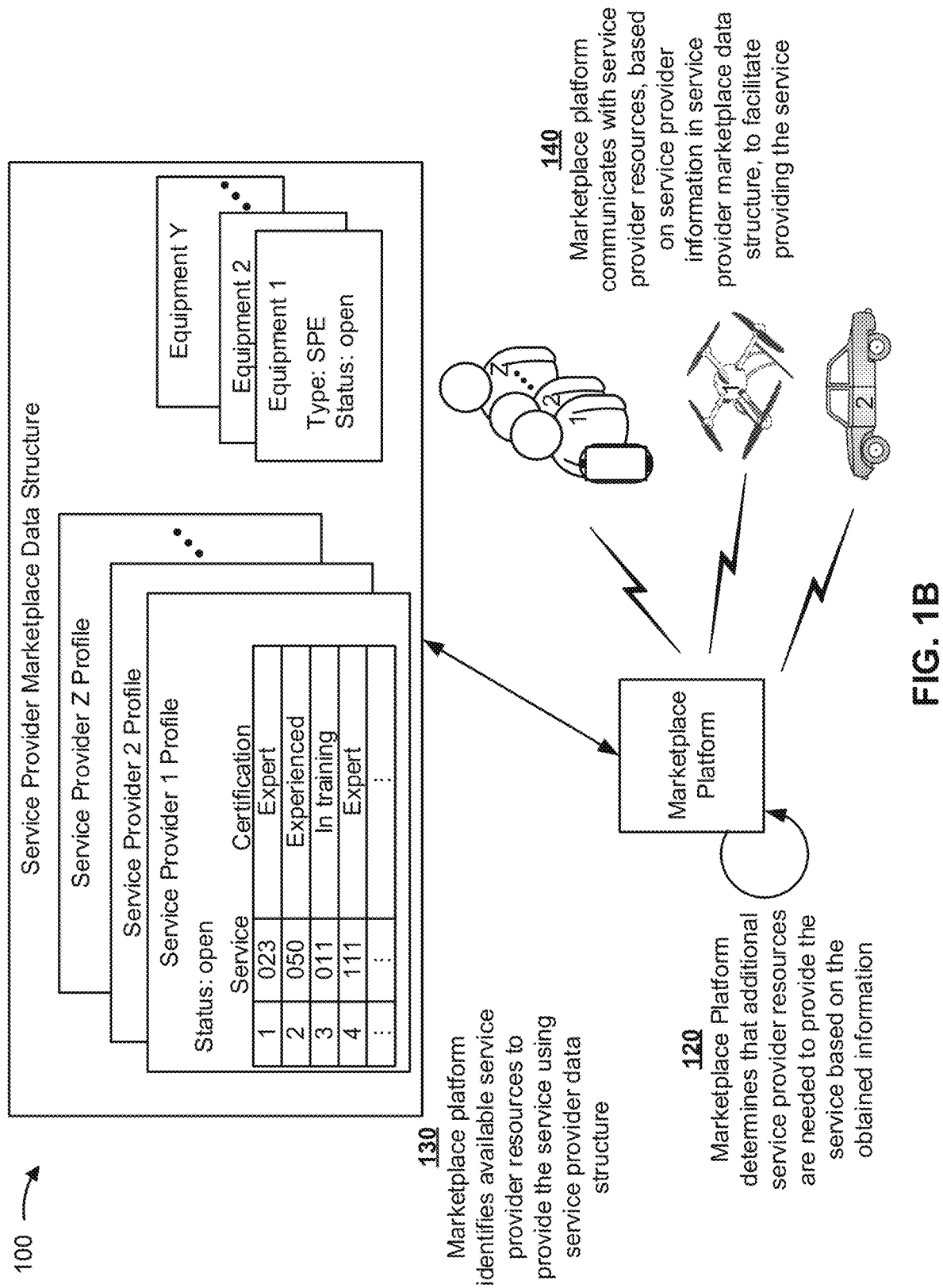

FIGS. 1A and 1B are diagrams of an overview of an example implementation 100 described herein. In example implementation 100 of FIGS. 1A and 1B, a marketplace platform facilitates allocation of resources to provide a service based on a predicted demand for the service.

As shown in FIG. 1A, and by reference number 110, the marketplace platform obtains information associated with a service. In such cases, the information associated with the service may be used to indicate a demand. For example, as shown in FIG. 1A, a consumer data structure may include M consumer profiles (M≥1) corresponding to M consumers of a particular service provider organization. Such consumer profiles may include consumer data for a particular region (e.g., a town or city, a county, a state, and/or the like) or service location of a service provider organization. As shown in FIG. 1A, the consumer data may identify a number of times that the M consumers received a particular service, when the service was received, what service was received, and/or detailed information about the provided service.

Furthermore, as shown in FIG. 1A, the marketplace platform may receive historical information associated with the service. In some implementations, the historical information associated with the service may be based on a region that is larger than the region associated with the consumer data (e.g., state wide region, a country wide region). The historical information may include a service log for the service, which may represent or indicate information corresponding to occurrences of when the service was provided.

As further shown in FIG. 1A, the marketplace platform receives information associated with the service from service location monitors and environmental monitors. The service location monitors and environmental monitors may be associated with a same region of a service provider organization as the consumer data of the consumer data structure.

In some implementations, the service location monitors of example implementation 100 may include transaction terminals (e.g., payment terminals, kiosks, self-service terminals, and/or the like) that facilitate providing the service. A status of the transaction terminals, indicating whether the transaction terminals are active, idle, or powered off, may be obtained by the marketplace platform. Additionally, or alternatively, the service location monitors may include cameras and/or sensors that may provide images or data that can be analyzed to identify a number of individuals (e.g., consumers, service providers, and/or the like) at the location. The environmental monitors may include devices that monitor environmental factors associated with or that affect the service. For example, the environment monitors may include one or more devices or feeds providing weather-related information, traffic-related information, social media activity or social media trends, breaking news, and/or the like. Accordingly, marketplace platform may use the obtained information (e.g., the status of the transaction terminals, the number of people at a service location, the environmental factors, and/or the like) from the service location monitors and the environmental monitors to determine a current demand or future demand for a service.

As shown in FIG. 1B, and by reference number 120, the marketplace platform determines that additional service provider resources (e.g., additional service providers and/or additional service provider equipment) are needed to provide the service based on the obtained information. For example, from the obtained information, the marketplace platform may predict a future demand for the service (e.g., using a model that is trained from the obtained data) during a particular time period (e.g., an upcoming week, an upcoming month, an upcoming season, and/or the like). In some implementations, the marketplace platform may compare the future demand to a capacity for the service provider organization to provide the service (e.g., based on information from the service location monitors, based on scheduling information associated with service providers or service provider equipment and/or the like).

As further shown in FIG. 1B, and by reference number 130, the marketplace platform identifies available service provider resources (e.g., service providers and/or service provider equipment) to provide the service using service provider data. For example, as shown, the marketplace platform may refer to a service provider marketplace data structure that includes information associated with service providers and/or service provider equipment that may or may not be associated with a particular service provider organization. Accordingly, the marketplace platform may identify additional service providers and/or service provider resources to facilitate providing the service during the time period associated with the future demand. As shown, the service provider marketplace data structure may indicate qualifications and/or availability of the service providers and type and/or availability of the equipment.

As further shown in FIG. 1B, and by reference number 140, the marketplace platform communicates with service provider resources, based on the service provider information in the service provider marketplace data structure, to facilitate providing the service. For example, the marketplace platform may identify one or more available service providers, and send a notification to a user device of the service provider indicating that the service provider is to provide the service during the time period. In some implementations, the notification may include a request to provide the service (which may be accepted or denied by the service provider). In some implementations, the notification may provide qualification information associated with providing the service (e.g., so that the service provider may become qualified to provide the service before the time period associated with the future demand). Additionally, or alternatively, the marketplace platform may communicate with the service provider equipment. For example, the marketplace platform may control or facilitate controlling the service provider equipment to be available to provide the service during the time period associated with the future demand. In some implementations, a notification may be sent to a service provider to use the service provider equipment and/or retrieve the service provider equipment to provide the service during the time period associated with the future demand for the service.

Accordingly, the marketplace platform of example implementation 100 enables a service provider organization to scale service provider resources appropriately based on predicted future demand for a service. As such, the marketplace platform may be used to allocate appropriate amounts of resources to provide a service to ensure that consumers' needs for the service are met and/or to ensure that resources (e.g. computing resources, network resources, power resources, hardware resources, equipment, and/or the like) are conserved by allocating the appropriate amount of resources (i.e., over allocation of resources can be avoided).

As indicated above, FIGS. 1A and 1B are provided merely as an example. Other examples are possible and may differ from what was described with regard to FIGS. 1A and 1B.

Figure 2:
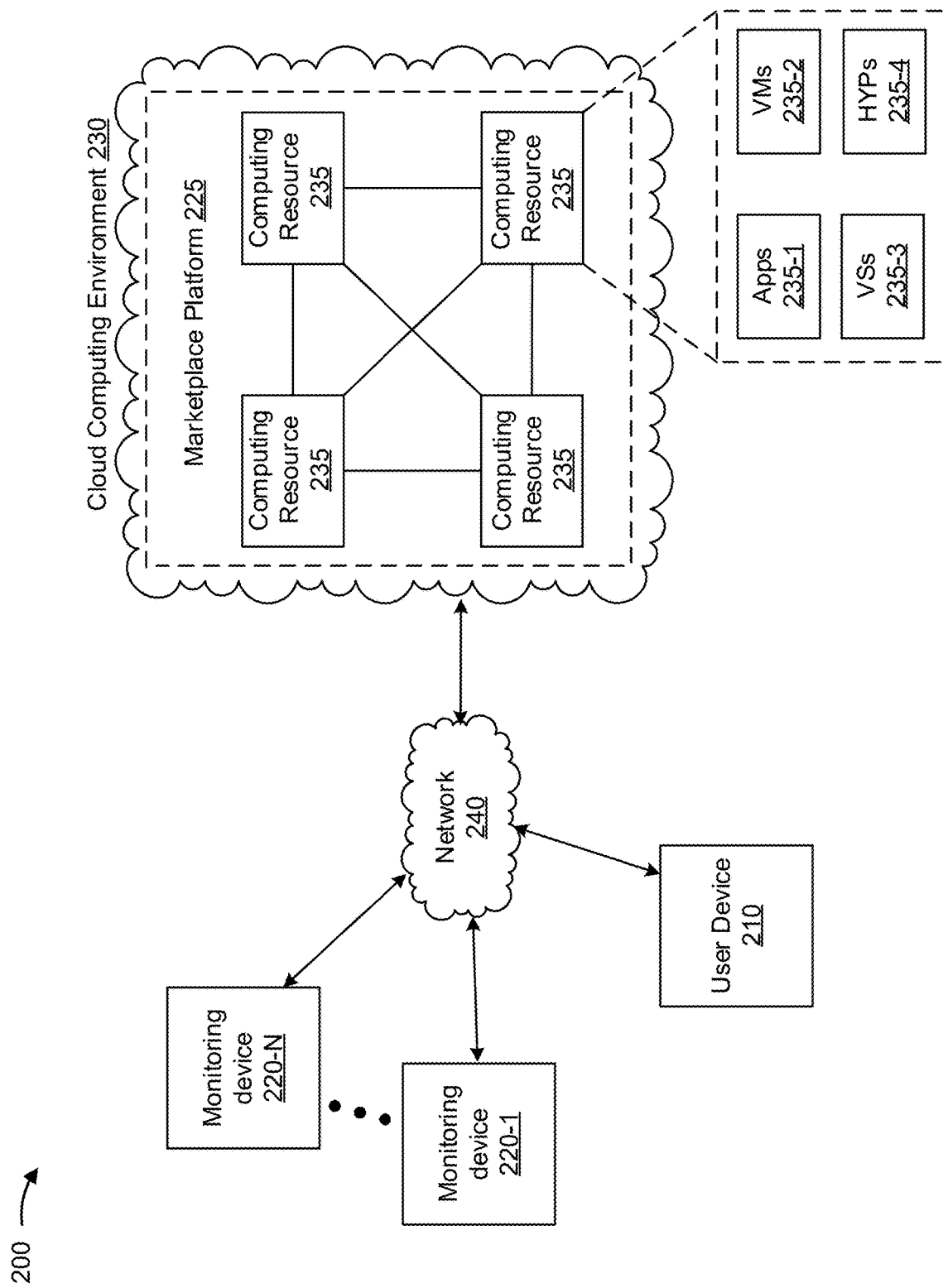
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a service provider device 210, one or more monitoring devices 220-1 through 220-N (N≥1) (hereinafter referred to collectively as "monitoring devices 220," and individually as "monitoring device 220"), a marketplace platform 225 hosted within a cloud computing environment 230, and a network 240. Devices of environment 200 may interconnect via wired connections, wireless connections, or a combination of wired and wireless connections.

Service provider device 210 includes one or more devices capable of receiving, generating, storing, processing, and/or providing information associated with identifying a service, providing a service, and/or determining a status of a service according to some implementations described herein. For example, service provider device 210 may include a user device with a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. Further, service provider device 210 may include a device capable of providing a service. For example, service provider device 210 may include an autonomous (or semi-autonomous) vehicle (e.g., an autonomous car, an autonomous truck, an autonomous semi-tractor or autonomous semi-tractor trailer combination, and/or the like), a unmanned aerial vehicle (UAV) (e.g., a drone), a portable kiosk (e.g., a kiosk that may be included within or attached to an autonomous vehicle), a transaction terminal, and/or any other type of device capable of providing a service according to implementations described herein.

Monitoring device 220 includes one or more devices capable of receiving, generating, storing, processing, and/or providing information associated with a status of a service and/or demand for a service. For example, monitoring device 220 may include a communication device and a computing device, such as a transaction terminal (e.g., a payment terminal, a kiosk terminal, a self-service terminal, an automated teller machine (ATM) terminal, and/or the like), a camera, a sensor, a weather monitor, a traffic monitor, a social media feed (e.g., a social media activity feed, a social media trend feed, and/or the like), a breaking news feed, and/or the like. As such, monitoring device 220 may communicate with marketplace platform 225 to provide information associated with a status of a service and/or a demand for a service.

Marketplace platform 225 includes one or more devices (e.g., computing resources 235) capable of monitoring a service according to implementations described herein. For example, marketplace platform 225 may be capable of monitoring the service via monitoring devices 220; determining a current demand for the service based on information from the monitoring devices; and/or identifying, using, or training a model used to predict a future demand for the service. In some implementations, marketplace platform 225 may indicate or provide information associated with a service to service provider device 210. For example, marketplace platform 225 may send instructions for providing a service to service provider device 210, may send instructions to control service provider device 210 to be available to provide the service (e.g., during a particular time period and/or at a particular location).

Cloud computing environment 230 includes an environment that delivers computing as a service, whereby shared resources, services, and/or the like may be provided to service provider device 210, and/or monitoring devices 220. Cloud computing environment 230 includes an environment that hosts marketplace platform 225. Cloud computing environment 230 may provide computation, software, data access, storage, and/or other services that do not require end-user knowledge of a physical location and/or configuration of a system and/or a device that delivers the services. As shown, cloud computing environment 230 may include a group of computing resources 235 (which may be referred to herein individually as computing resource 235).

Notably, while implementations described herein describe marketplace platform 225 as being hosted in cloud computing environment 230, in some implementations, marketplace platform 225 may not be cloud-based (i.e., may be implemented outside of a cloud computing environment) or may be partially cloud-based.

Computing resource 235 includes one or more personal computers, workstation computers, server devices, or another type of computation and/or communication device. In some implementations, one or more computing resources 235 may host marketplace platform 225. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by service provider device 210. Application 235-1 may eliminate a need to install and execute the software applications on service provider device 210. For example, application 235-1 may include software associated with marketplace platform 225 and/or any other software capable of being provided via cloud computing environment 230. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., via service provider device 210), and may manage infrastructure of cloud computing environment 230, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
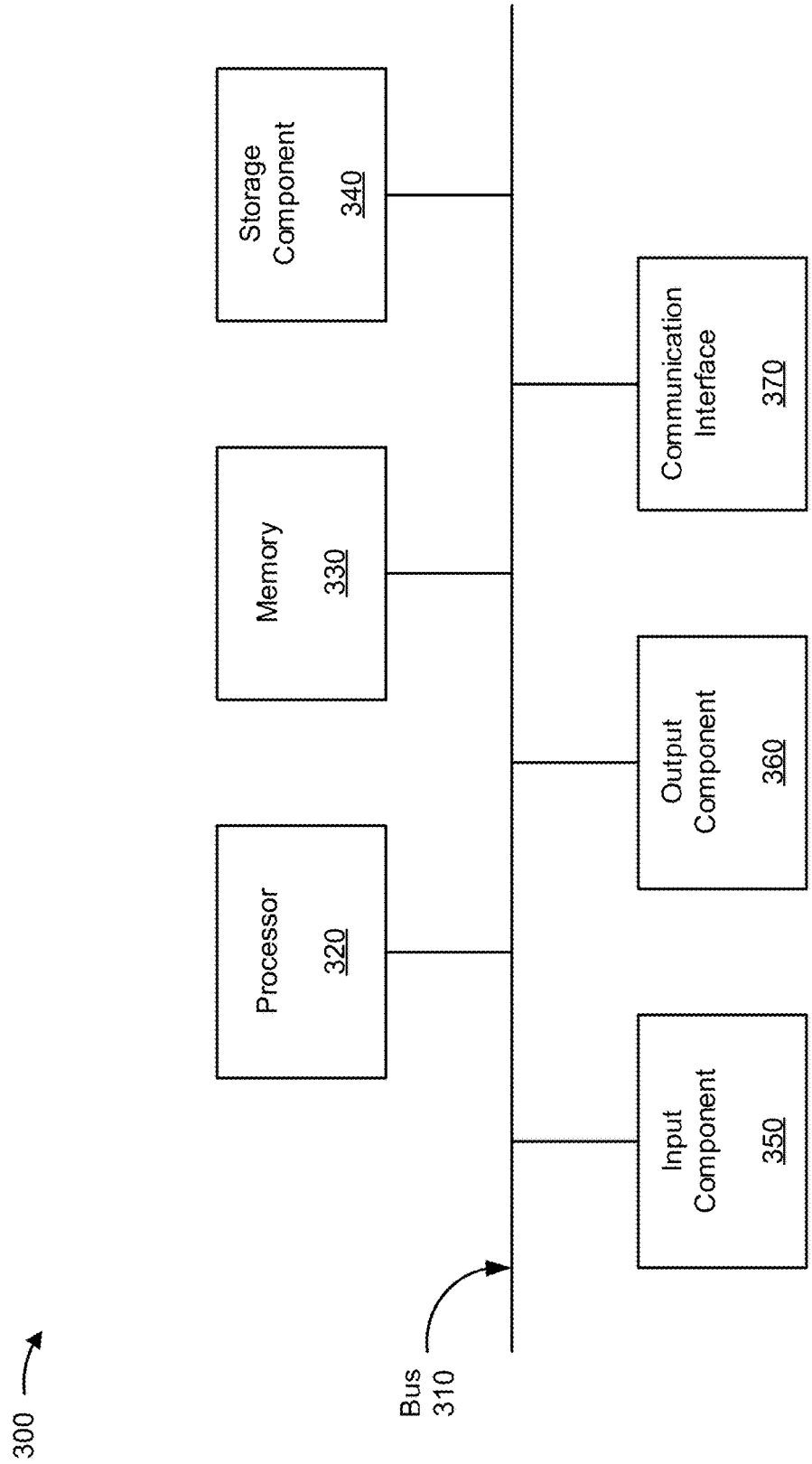
FIG. 3 is a diagram of example components of one or more devices of FIG. 2.

FIG. 3 is a diagram of example components of a device 300. Device 300 may correspond to service provider device 210, monitoring device 220, marketplace platform 225, or computing resource 235. In some implementations, service provider device 210, monitoring device 220, marketplace platform 225, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
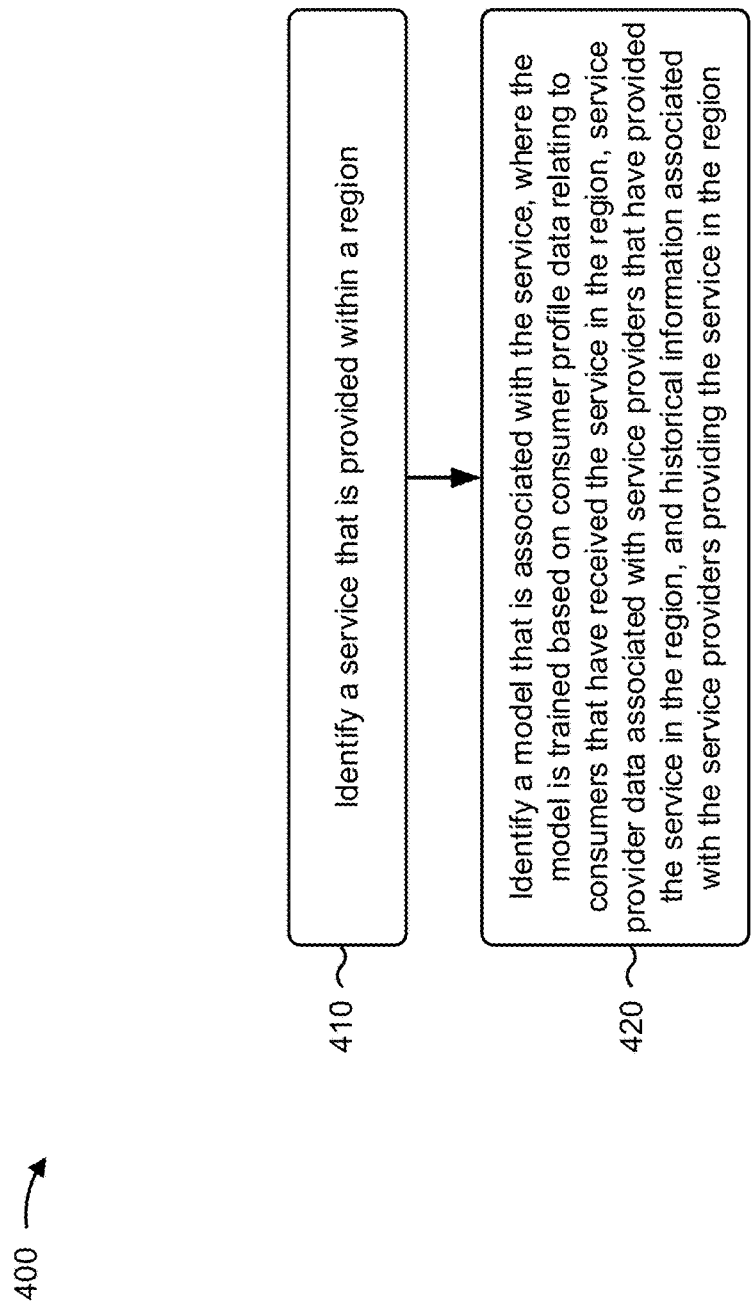
FIG. 4 is a flow chart of an example process for allocating service provider resources based on a capacity to provide the service.

FIG. 4 is a flow chart of an example process 400 for allocating service provider resources based on a capacity to provide the service. In some implementations, one or more process blocks of FIG. 4 may be performed by marketplace platform 225. In some implementations, one or more process blocks of FIG. 4 may be performed by another device or a group of devices separate from or including marketplace platform 225, such as service provider device 210 or monitoring device 220.

As shown in FIG. 4, process 400 may include identifying a service that is provided within a region (block 410). For example, marketplace platform 225 may identify the service. In some implementations, marketplace platform 225 identifies the service based on the service being included within a data structure associated with marketplace platform 225, based on receiving an identifier associated with the service, based on receiving a user input, and/or the like.

According to some implementations, a service may include any action or interaction that may be purchased or received by an individual (e.g., via a service provider or service provider equipment). In some implementations, the service may include a banking service (e.g., a banking account service, an ATM service, a transaction card service (e.g., to request or receive a new transaction card), an investment banking service, a loan service, and/or the like). Additionally, or alternatively, the service may include a healthcare service, a legal service, an accounting service, an emergency response service, a security service, and/or the like.

According to some implementations, a region may correspond to an area or location that is serviced by a service provider organization. Accordingly, the region may be a geographical area, a building, a campus, and/or the like. In some implementations, the region may correspond to a particular town, city, county, state, country, and/or the like.

Marketplace platform 225 may identify the service that is provided in the region based on monitoring devices associated with a particular service location and/or receiving information with a particular service location. In some implementations, marketplace platform 225 may determine the region from locations of the service locations. For example, marketplace platform 225 may identify geographical coordinates of the service locations and determine the region based on the geographical coordinates and a particular range or distance from the geographical coordinates.

In this way, marketplace platform 225 may identify a service that is provided within a region to enable marketplace platform 225 to identify a model associated with the service.

As further shown in FIG. 4, process 400 may include identifying a model that is associated with the service, where the model is trained based on consumer profile data relating to consumers that have received the service in the region, service provider data associated with service providers that have provided the service in the region, and historical information associated with providing the service; (block 420). For example, marketplace platform 225 may identify the model associated with the service. In some implementations, marketplace platform 225 may identify the model based on identifying a service that is provided in a region, based on receiving a request (e.g., from service provider device 210), based on receiving a user input, based on an event (e.g., current demand for the service reaches a threshold, an update to the model, a change in data to the model, and/or the like), and/or the like.

Consumer profile data includes data relating to consumers that have received the service in the region. For example, the consumer profile data may include, for each consumer that received the service in the region, a number of times the consumer received the service, times and/or dates that the consumer received the service, a service provider and/or service provider equipment that provided the service, feedback associated with the provided service, and/or the like. In some implementations, marketplace platform 225 may maintain a consumer profile data structure, to store consumer profile data, that is updated (e.g., periodically or aperiodically) as consumers receive the service within the region.

Service provider data includes data associated with service providers that have provided the service in the region. For example, the service provider data may include, for each service provider (and/or service provider equipment), a number of times that the service provider provided the service, times and/or dates that the service provider provided the service, a consumer that received the provided service, service provider equipment used to provide the equipment, and/or the like. In some implementations, marketplace platform 225 may maintain a service provider data structure, to store service provider data, that is updated as service providers provide the service in the region.

Historical information associated with providing the service may include information about the service being provided outside of the region. For example, historical information may provide information associated with a region that is larger than the region associated with the consumer data and/or the service provider data. As such, the historical information may provide high level information associated with the service. For example, the historical information may include when the service was initially provided, a frequency at which the service has been provided (e.g., over time or during certain time periods), and/or the like.

In some implementations, marketplace platform 225 may train and/or implement machine learning to train the model. In some implementations, marketplace platform 225 may receive the model and/or receive information associated with the model. According to some implementations, the model may be any model that can be trained and/or updated according to changes in the consumer profile data, the service provider data, and/or the historical information (which may be referred to herein as "the data sets"). The data sets may include millions, billions, or trillions of data points regarding the service. As such, the model may be trained using such large data sets that cannot be processed objectively by a human individual.

In some implementations, the model may be a model that is trained using machine learning. The model may implement data cleansing (e.g., to obtain and/or preprocess the consumer profile data, service provider data, and/or historical information), (un)supervised training (which may split the data sets (e.g., as a whole or individually) for training purposes between test sets, validation sets, and training sets), classification, and/or other machine learning elements. The model may be created using a logistic regression, a Naïve Bayesian classifier, and/or a support vector machine (SVM) classifier. In some implementations, the model may include a natural language processing model (e.g., to identify terms or words associated with providing a service in the data sets)

According to some implementations, the model may be trained to identify trends that indicate past demand for the service using the consumer profile data, the service provider data, and the historical information. For example, the trends may identify recurrences within the data (e.g., during certain time periods). For example, the model may identify consumer trends in consumer profile data relating to consumers that have received the service in the region, service provider trends in service provider data associated with service providers that have provided the service in the region, and/or historical trends in the historical information.

In some implementations, the model may be trained to estimate a number of times the service is to be provided during a time period (e.g., a future time period). For example, using a current demand, marketplace platform 225 may refer to the model to predict a future demand for the service during the time period.

In this way, marketplace platform 225 may identify or obtain a model associated with the service and/or determining or predicting a demand associated with the service.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
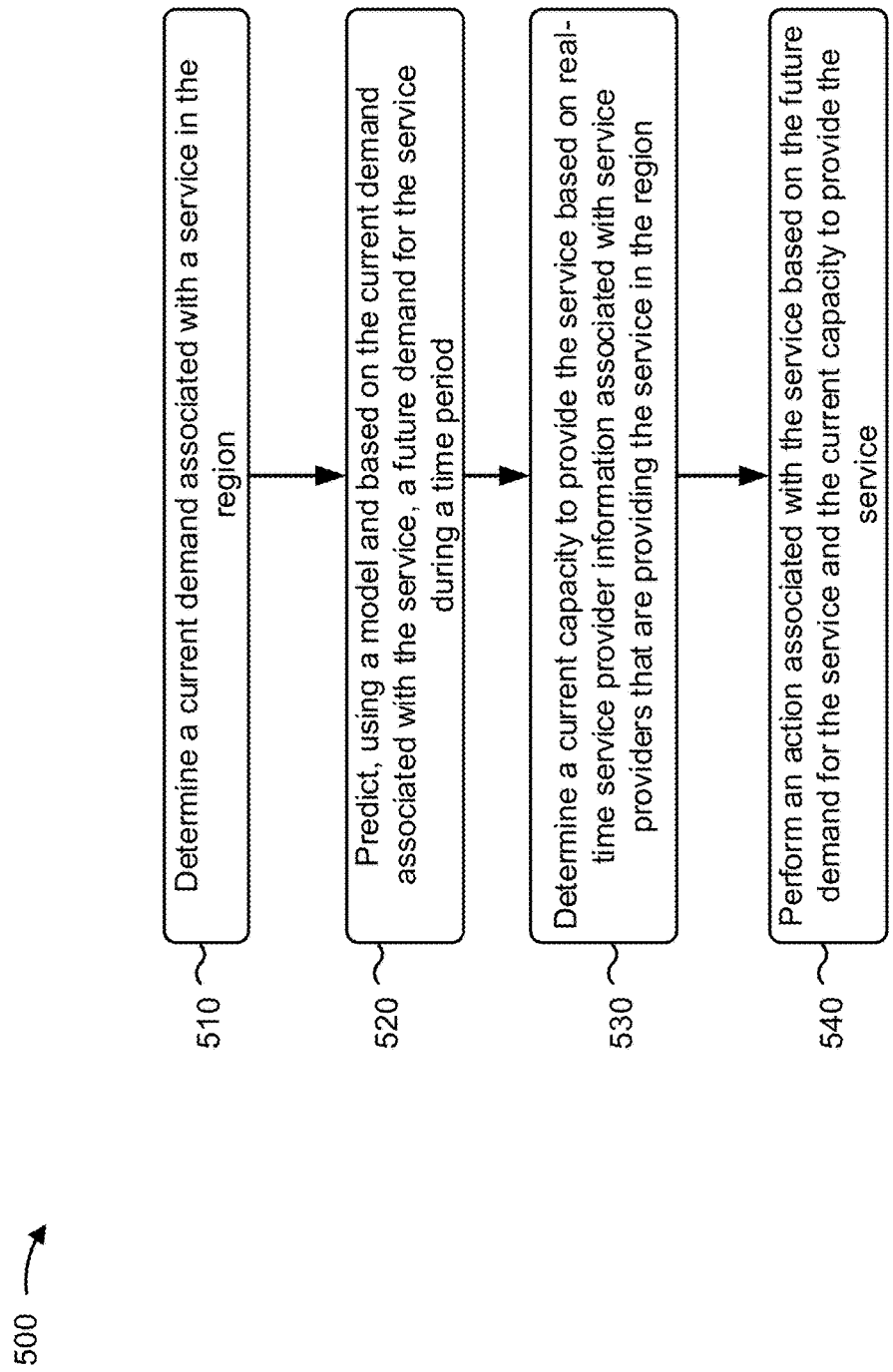
FIG. 5 is a flow chart of another example process for allocating service provider resources based on a capacity to provide the service.

FIG. 5 is a flow chart of an example process 500 for allocating service provider resources based on a capacity to provide the service. In some implementations, one or more process blocks of FIG. 5 may be performed by marketplace platform 225. In some implementations, one or more process blocks of FIG. 5 may be performed by another device or a group of devices separate from or including marketplace platform 225, such as service provider device 210 or monitoring device 220. In some implementations, process 500 may be performed based on results of process 400, in parallel with process 400, and/or after process 400.

As shown in FIG. 5, process 500 may include determining a current demand associated with the service in the region (block 510). For example, marketplace platform 225 may determine the current demand for the service. In some implementations, marketplace platform 225 determines the current demand based on usage or a rate of providing the service satisfying a threshold, based on an event (e.g., an environmental event), based on a request from a service location and/or service provider device 210, based on a user input, and/or the like.

A current demand may reflect a rate at which a service is currently being provided to consumers. According to some implementations, the current demand may be determined based on real-time usage data associated with service providers that are currently providing the service in the region. The example real-time usage data may indicate current usage (e.g., within milliseconds) of one or more transaction terminals, service provider equipment, and/or service provider device 210 associated with the service. For example, a percentage of transaction terminals, service provider equipment, and/or service provider devices 210 in use may indicate a corresponding current demand (e.g., depending on the service). As such, in some implementations, marketplace platform 225 may obtain the real-time usage data may virtually immediately from monitoring devices 220 (e.g., via status indicators indicating that transaction terminal or other service provider equipment that is in use is active or inactive) to determine the current demand.

In some implementations, marketplace platform 225 may use real-time environment data to determine current demand. In some implementations, the environment data may be received from monitoring devices 220 and/or service provider devices 210. As an example, monitoring device 220 may provide traffic information associated with traffic within the region. If the traffic information indicates a high density of traffic within the region, depending on the service, the high density may indicate a higher or lower current demand for the service.

In some implementations, marketplace platform 225 may use a model (e.g., a machine learning model as described herein) to determine the current demand. As such, real-time usage data and/or real-time environment data may be tracked and/or updated according to the model to determine the current demand. In some implementations, the model to determine the current demand may include a natural language processing model to identify key terms, words, or phrases associated with the service (e.g., from social media feeds, breaking news feeds, and/or the like).

In this way, marketplace platform 225 may determine a current demand for the service to enable the marketplace platform to predict a future demand for the service.

As further shown in FIG. 5, process 500 may include predicting, using the model and based on the current demand associated with the service, a future demand for the service during a time period (block 520). For example, marketplace platform 225 may predict the future demand. In some implementations, marketplace platform 225 may predict the future demand based on determining the current demand, based on an event occurring, based on receiving a user input, and/or the like.

A future demand corresponds to a demand for the service during a future time period. The future time period may be a quantity of hours from a current time period, a quantity of days from a current time period, a quantity of weeks from a current time period, a quantity of months from a current time period, and/or the like. The future demand may correspond to a number of times that the service is to be provided during the time period, and/or a rate at which the service is to be provided during the time period.

In some implementations, to determine the future demand, marketplace platform 225 may determine characteristics of the current demand for the service and predict the future demand using the model and based on the characteristics of the current demand. In such instances, the characteristics may correspond to a time (e.g., time of year, time of month, time of week, time of day, and/or the like), a location (e.g., a location of or within the region), environmental factors associated with the current demand (e.g., weather, traffic, news, social media trends, and/or the like). For example, the characteristics of the current demand may correspond to characteristics of a past demand identified or learned by the model. The marketplace platform 225, using the model and information corresponding to a time period associated with the past demand, may predict a similar demand for the future demand (or at least a demand based on the past demand). As such, the marketplace platform 225 may use the model to predict the future demand based on the characteristics of the current demand.

In some implementations, marketplace platform 225 may predict the future demand based on a prediction model (e.g., linear regression, logistic regression, a decision tree, a random forest, a gradient boosting, a neural network, and/or the like). Additionally, or alternatively, marketplace platform 225 may utilize a machine learning model to predict the future demand. As such, the data sets, the current demand, and/or environment data may be trained within the model to predict the future demand.

In this way, marketplace platform 225 may predict a future demand for the service during a time period to permit marketplace platform 225 to determine whether a current capacity to provide the service can handle the future demand.

As further shown in FIG. 5, process 500 may include determining a current capacity to provide the service based on real-time service provider information associated with service providers that are providing the service in the region (block 530). For example, marketplace platform 225 may determine the current capacity to provide the service. In some implementations, marketplace platform 225 determines the current capacity based on predicting the future demand.

A capacity to provide the service refers to an amount of service provider resources, of a service provider organization, that are allocated to provide a service. Accordingly, a current capacity to provide a service may correspond to a current allocation of service provider resources, including service providers and/or service provider equipment capable of providing the service.

In some implementations, marketplace platform 225 may determine the current capacity based on real-time service provider information from service providers that are currently providing the service in the region. For example, marketplace platform 225 may determine an amount of service provider resources that are providing the service based on information from monitoring devices 220 (e.g., based on transaction terminal usage) and/or information from service provider devices 210. Additionally, or alternatively, marketplace platform 225 may maintain a schedule associated with service provider resources that are providing the service. As such, marketplace platform 225 may refer to the schedule to identify an amount of service provider resources providing the service.

In this way, marketplace platform 225 may determine the current capacity to provide the service to enable marketplace platform 225 to perform an action based on the future demand for the service and the current capacity to provide the service.

As further shown in FIG. 5, process 500 may include performing an action associated with the service based on the future demand for the service and the current capacity to provide the service (block 540). For example, marketplace platform 225 may perform the action. In some implementations, marketplace platform 225 may perform the action based on determining the future demand for the service, determining the current capacity to provide the service, and/or the like.

In some implementations, marketplace platform 225 may perform an action that includes comparing the future demand for the service and the current capacity to provide the service (e.g., in order to determine if the current capacity is sufficient to meet the future demand, to determine if the current capacity is excessive relative to the future demand, and/or the like). For example, when marketplace platform 225 determines that the future demand for the service exceeds the current capacity to provide the service, marketplace platform 225 may identify one or more additional service providers that are available to provide the service in the region. In such cases, marketplace platform 225 may perform an action that includes sending a notification (e.g., service provider device 210) to the one or more additional service providers to be available to provide the service in the region.

According to some implementations, a notification may include a message, file, attachment, calendar invite, image, and/or the like. In some implementations, a notification may cause service provider device 210 to populate a calendar with an appointment, cause service provider device 210 to provide an alert (e.g., flash a light of service provider device 210, activate a vibration mechanism of service provider device 210, emit a sound from a speaker of service provider device 210, and/or the like), cause service provider device 210 to indicate a time and/or location for providing the service, cause service provider device 210 to navigate a service provider to a location to provide the service, and/or the like. In some implementations, a notification may include an offer or request, which may be displayed via service provider device 210, for a service provider to provide a service. In such cases, the offer or request may include an employment agreement or a service agreement that indicates compensation for providing the service.

Furthermore, in some implementations, marketplace platform 225 may perform an action that includes causing an account (e.g., a financial account, a rewards account, and/or the like) to be credited (e.g., with currency, with rewards points, and/or the like) for providing the service. In such cases, marketplace platform 225 may authorize such a transaction based on receiving a confirmation from service provider device 210 and/or service provider equipment that a service was completed.

In some implementations, a notification may cause an autonomous vehicle to go to a location (e.g., to pick one or more service providers or service provider equipment, to facilitate providing the service, and/or the like), cause a UAV to go to a location, and/or the like. Accordingly, marketplace platform 225 may perform an action that includes automatically controlling one or more machines of the one or more additional service providers (e.g., service provider equipment) to relocate to a particular location of the region to facilitate providing the service during the time period. In some implementations, marketplace platform 225 may determine a location of interest for providing the service within the region. For example, the location of interest may be determined based on the future demand for the service and locations of providing the service indicated in the consumer profile data, locations of providing the service in the service provider data, and/or locations of providing the service in the historical information. As such, using location information from the data sets of the model, marketplace platform 225 may determine a relatively optimal location for service provider equipment and/or service providers to provide a service within the region.

In some implementations, marketplace platform 225 may cause deployment of the service provider equipment using one or more of an address, navigational instructions, traffic information, and/or the like. In some implementations, marketplace platform 225 may determine a departure time and/or arrival time for the service provider equipment based on the time period associated with the future demand and/or a distance between the service provider equipment and the location of interest.

In some implementations, marketplace platform 225 may perform an action that includes identifying one or more potential additional service providers that may provide the service but are not qualified to provide the service (e.g., due to lack of experience, lack of being certified, and/or the like. In such cases, marketplace platform 225 may transmit qualification information to the one or more potential additional service providers to enable the one or more additional service providers to be qualified and available to provide the service during the time period. For example, marketplace platform 225 may obtain qualification information (e.g., from a website, from certification database, and/or the like) and provide the qualification information to service provider device 210. In such cases, the qualification information may identify the needed certification, may include information associated with a class (e.g., in person class, online class, and/or the like) to become certified, may include time or location for the class, and/or the like.

In some implementations, when marketplace platform 225 determines that the current capacity to provide the service exceeds the future demand for the service, marketplace platform 225 may identify one or more service providers that are providing the service in the region. In such cases, marketplace platform 225 may notify the one or more of the service providers to cease providing the service in the region. For example, marketplace platform 225 may send a notification to service provider device 210, instructing service provider device 210 to cease providing the service. In some implementations, marketplace platform 225 may cause service provider equipment (e.g., autonomous vehicles, autonomous UAVs, and/or the like) to return to a storage location. For example, marketplace platform 225 may provide an address and/or navigation instructions to reach the storage location in a similar manner as providing the address and navigation instructions to the location of interest to provide the service.

In this way, marketplace platform 225 may perform an action based on the future demand for the service and the current capacity to provide the service.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

According to some implementations described herein, a marketplace platform enables a service provider organization to scale service provider resources (e.g., service providers and/or service provider equipment) according to a determined demand (e.g., future demand) for the service. As such, a model and current demand (which may be based on real-time usage and/or environmental factors) may be used to determine a future demand for the service. Based on the future demand, and a current capacity of the service provider organization, the service provider organization may either increase or decrease service provider resources (e.g., within a particular region). As such, some implementations enable a service provider organization to provision enough service provider resources to meet the needs of consumers while avoiding over staffing and/or over deploying service provider equipment to provide the service. Accordingly, the service provider organization may increase revenue and/or profits and meet the needs of potential consumers while conserving computing resources, network resources, power resources, and/or hardware resources used to provide the service.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   obtaining, by a device that includes one or more processors, and from one or more environmental monitoring devices, environment data that indicates one or more environmental factors that affect a service that is provided in a region, the one or more environmental monitoring devices including at least one of a camera, a sensor, a weather monitor, or a traffic monitor;
   monitoring, by the device and using a first set of monitoring devices, a status of each a plurality of transaction terminals at a service location of the service,
      wherein the first set of monitoring devices is associated with the service location, and
      wherein the status is indicative of whether each of the plurality of transaction terminals is active, idle, or powered off;
   monitoring, by the device and using a second set of monitoring devices associated with the service location, a quantity of individuals at the service location,
      wherein the second set of monitoring devices captures images or other data that is analyzed to determine the quantity of individuals;
   determining, by the device and based on the environment data, the quantity of individuals, and the status of each of the plurality of transaction terminals, a current demand associated with the service;
   predicting, by the device, a future demand associated with the service based on one or more characteristics that are determined using the current demand and a past demand associated with the service; and
   transmitting, by the device, a machine-executable instruction to one or more resources that causes the one or more resources to relocate to a particular location to provide the service,
      wherein the one or more resources are allocated to the particular location based on the future demand and a current capacity associated with providing the service, and
      wherein the one or more resources include at least one of: a computing resource, a power resource, a hardware resource, or an equipment.

2. The method of claim 1, wherein the current demand is based on one or more of:
   a usage or a rate, associated with the service location providing the service, satisfying a threshold,
   an event associated with the service,
   a request from the service location, or
   a user input on behalf of a consumer of the service.

3. The method of claim 1, wherein at least one characteristic, of the one or more characteristics, corresponds to:
   a time period, a location, or
   environmental factors.

4. The method of claim 1, wherein the future demand is predicted by a model associated with the service.

5. The method of claim 4, wherein the model includes a natural language processing model to identify key terms, words, or phrases associated with the service.

6. The method of claim 4, wherein the model is a machine learning model.

7. The method of claim 4, wherein the model is trained based on one or more of:
   consumer profile data relating to one or more prior consumers of the service,
   service provider data associated with a service provider that has provided the service, or
   historical information associated with providing the service.

8. The method of claim 4, wherein the model is trained to:
   identify one or more trends that indicate the past demand, or
   estimate a quantity of times the service is to be provided for a future period of time associated with the future demand.

9. The method of claim 1, wherein the future demand corresponds to:
   a quantity of times that the service is to be provided during a future period of time associated with the future demand, or
   a rate at which the service is to be provided during the future period of time.

10. The method of claim 4, further comprising:
    tracking real-time data associated with the service; and
    updating the model based on the real-time data.

11. A device, comprising:
    a memory;
    one or more processors, coupled to the memory, are configured to:
       obtain, from one or more environmental monitoring devices, environment data that indicates one or more environmental factors that affect a service that is provided in a region, the one or more environmental monitoring devices including at least one of a camera, a sensor, a weather monitor, or a traffic monitor;
       monitor, using a first set of monitoring devices, a status of each a plurality of transaction terminals at a service location of the service,
          wherein the first set of monitoring devices is associated with the service location, and
          wherein the status is indicative of whether each of the plurality of transaction terminals is active, idle, or powered off;
       monitor, using a second set of monitoring devices associated with the service location, a quantity of individuals at the service location,
          wherein the second set of monitoring devices captures images or other data that is analyzed to determine the quantity of individuals;

determine, based on real-time service location information associated with the environment data, the quantity of individuals, and the status of each of the plurality of transaction terminals, a current demand associated with the service;

predict, using a model associated with the service, a future demand associated with the service based on one or more characteristics that are determined using the current demand and a past demand associated with the service;

determine, based on real-time service provider information different from the real-time service location information and associated with the service location, a current capacity to provide the service; and transmit a machine-executable instruction to one or more resources that causes the one or more resources to relocate to a particular location to provide the service,
  wherein the one or more resources are allocated to the particular location based on the future demand and a current capacity associated with providing the service, and
  wherein the one or more resources include at least one of: a computing resource, a power resource, a hardware resource, or an equipment.

12. The device of claim 11, wherein the real-time service provider information is received from one or more monitoring devices or one or more service provider devices.

13. The device of claim 11, wherein the one or more processors are further configured to:
  maintain a schedule associated with the service; and
  identify, based on the schedule, a quantity of service provider resources providing the service,
    wherein the real-time service provider information includes the quantity of service provider resources providing the service.

14. The device of claim 11, wherein the past demand is identified or learned by the model.

15. The device of claim 11, wherein:
  the first set of monitoring devices include at least one of a transaction terminal, of the plurality of transaction terminals, that facilitates providing the service, or
  the second set of monitoring devices include at least one of a camera or a sensor that provides an image or data for identifying the plurality of transaction terminals or the quantity of individuals at the service location.

16. The device of claim 11, wherein the model is trained to:
  identify one or more trends that indicate the past demand, or
  estimate a quantity of times the service is to be provided for a future period of time associated with the future demand.

17. A non-transitory computer-readable medium storing instructions, the instructions comprising:
  one or more instructions that, when executed by one or more processors, cause the one or more processors to:
    obtain, from one or more environmental monitoring devices, environment data that indicates one or more environmental factors that affect a service that is provided in a region, the one or more environmental monitoring devices including at least one of a camera, a sensor, a weather monitor, or a traffic monitor;
    monitor, using a first set of monitoring devices, a status of each a plurality of transaction terminals at a service location of the service,
      wherein the first set of monitoring devices is associated with the service location, and
      wherein the status is indicative of whether each of the plurality of transaction terminals is active, idle, or powered off;
    monitor, using a second set of monitoring devices associated with the service location, a quantity of individuals at the service location,
      wherein the second set of monitoring devices captures images or other data that is analyzed to determine the quantity of individuals;
    determine, based on the environment data, the quantity of individuals, and the status of each of the plurality of transaction terminals, a current demand associated with the service;
    predict a future demand associated with the service based on one or more characteristics that are determined using the current demand and a past demand associated with the service; and
    transmit a machine-executable instruction to one or more resources that causes the one or more resources to relocate to a particular location to provide the service,
      wherein the one or more resources are allocated to the particular location based on the future demand and a current capacity associated with providing the service, and
      wherein the one or more resources include at least one of: a computing resource, a power resource, a hardware resource, or an equipment.

18. The non-transitory computer-readable medium of claim 17, wherein the allocating of the one or more resources is associated with one or more service providers that provide the service.

19. The non-transitory computer-readable medium of claim 18, wherein the one or more instructions, that cause the one or more processors to allocate the one or more resources, further cause the one or more processors to:
  identify one or more potential service providers, of the one or more service providers, capable of providing the service and not qualified to provide the service; and
  transmit qualification information to the one or more potential service providers to enable the one or more potential service providers to be qualified to provide the service.

20. The non-transitory computer-readable medium of claim 18, wherein the one or more instructions, that cause the one or more processors to allocate the one or more resources, further cause the one or more processors to:
  identify, based on the future demand and the current capacity, the one or more service providers that are available to provide the service,
  wherein allocating the one or more resources is further based on identifying the one or more service providers.

* * * * *